United States Patent
Garcia et al.

(10) Patent No.: US 9,826,572 B2
(45) Date of Patent: Nov. 21, 2017

(54) WIRELESS ENHANCED PROJECTOR

(71) Applicants: Adrian Ortega Garcia, Guadalajara (MX); Shing Yung Lo, Santa Clara, CA (US); Lin Chun Han, Santa Clara, CA (US); Soon Yueh Shen, Santa Clara, CA (US); Ong Gee Tat, Santa Clara, CA (US); Alan Previn Teres Alexis, Santa Clara, CA (US); Andrey Larionov, Santa Clara, CA (US); Yang Su Ming, Santa Clara, CA (US); Abhijeet Ashok Kolekar, Santa Clara, CA (US); Allen Hung, Santa Clara, CA (US); Neal Patrick Smith, Santa Clara, CA (US); Tung Ean Ean, Santa Clara, CA (US); Jose Gerardo Galindo Valadez, Santa Clara, CA (US); Armando Rubio Torroella, Santa Clara, CA (US); Ivan Gomes Castellanos, Santa Clara, CA (US); Mario Barba Garcia, Santa Clara, CA (US); Soo Phing Tan, Santa Clara, CA (US); Chan Wai Phang, Santa Clara, CA (US); Ooi Joo Aik, Santa Clara, CA (US); Ooi Ping Chuin, Santa Clara, CA (US); Tan Zheng Jing, Santa Clara, CA (US); Chai Eong Boo, Santa Clara, CA (US)

(72) Inventors: Adrian Ortega Garcia, Guadalajara (MX); Shing Yung Lo, Santa Clara, CA (US);

(Continued)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 13/628,606

(22) Filed: Sep. 27, 2012

(65) Prior Publication Data

US 2013/0246644 A1 Sep. 19, 2013

Related U.S. Application Data

(60) Provisional application No. 61/611,102, filed on Mar. 15, 2012.

(51) Int. Cl.
*G06F 15/16* (2006.01)
*H04W 88/02* (2009.01)
(Continued)

(52) U.S. Cl.
CPC .......... *H04W 88/02* (2013.01); *H04W 84/10* (2013.01); *H04W 84/20* (2013.01)

(58) Field of Classification Search
CPC .............................. H04W 88/10; H04W 84/20
See application file for complete search history.

(56) References Cited

U.S. PATENT DOCUMENTS

2002/0089523 A1* 7/2002 Hodgkinson ...... H04N 5/44504
                                                                      345/660
2006/0004636 A1* 1/2006 Kester et al. ................... 705/22

(Continued)

FOREIGN PATENT DOCUMENTS

JP        2011-249957 A    12/2011
WO     2013/138741 A1     9/2013

OTHER PUBLICATIONS

Amazon, "Wireless Projector", retrieved on Dec. 9, 2014, 5 pages. Also available at: http://www.amazon.com/s/ref=nb_sb_noss?url=search-aliass%3Daps&field-keywords=wireless+projector&x=0&y=0.

(Continued)

*Primary Examiner* — Vivek Srivastava
*Assistant Examiner* — Nicholas Celani
(74) *Attorney, Agent, or Firm* — Schiff Hardin LLP (57) ABSTRACT

Described herein are techniques related to a wireless enhanced projector (WEP) that is utilized by one or more (Continued)

devices, such as a mobile phone, a cellular phone, a Smartphone, a personal digital assistant, a tablet computer, and the like. In an implementation, the one or more devices may connect to the WEP through a server device that may be connected and/or integrated with the WEP. In this implementation, at least one of the one or more devices may be configured to be a super-user device (i.e., moderator or administrator device), while the rest of the one or more devices may be regular client devices.

18 Claims, 8 Drawing Sheets

(72) Inventors: Lin Chun Han, Santa Clara, CA (US); Soon Yueh Shen, Santa Clara, CA (US); Sivakumar Murugesu, Santa Clara, CA (US); Ong Gee Tat, Santa Clara, CA (US); Alan Previn Teres Alexis, Santa Clara, CA (US); Andrey Larionov, Santa Clara, CA (US); Yang Su Ming, Santa Clara, CA (US); Abhijeet Ashok Kolekar, Santa Clara, CA (US); Allen Hung, Santa Clara, CA (US); Neal Patrick Smith, Santa Clara, CA (US); Tung Ean Ean, Santa Clara, CA (US); Jose Gerardo Galindo Valadez, Santa Clara, CA (US); Armando Rubio Torroella, Santa Clara, CA (US); Ivan Gomes Castellanos, Santa Clara, CA (US); Mario Barba Garcia, Santa Clara, CA (US); Soo Phing Tan, Santa Clara, CA (US); Chan Wai Phang, Santa Clara, CA (US); Ooi Joo Aik, Santa Clara, CA (US); Ooi Ping Chuin, Santa Clara, CA (US); Tan Zheng Jing, Santa Clara, CA (US); Chai Eong Boo, Santa Clara, CA (US)

(51) Int. Cl.
*H04W 84/10* (2009.01)
*H04W 84/20* (2009.01)

(56) References Cited

U.S. PATENT DOCUMENTS

| | | | |
|---|---|---|---|
| 2006/0025122 A1* | 2/2006 | Harris et al. | 455/419 |
| 2008/0058011 A1 | 3/2008 | Lin et al. | |
| 2008/0136918 A1 | 6/2008 | Yamazaki et al. | |
| 2008/0212499 A1* | 9/2008 | Maes | 370/265 |
| 2009/0079884 A1* | 3/2009 | Lin | 348/739 |
| 2009/0182852 A1* | 7/2009 | Ng | 709/222 |
| 2010/0002151 A1 | 1/2010 | Pan | |
| 2010/0281384 A1* | 11/2010 | Lyons et al. | 715/723 |
| 2011/0142032 A1* | 6/2011 | Hayden et al. | 370/352 |
| 2011/0210972 A1* | 9/2011 | Tsirkin et al. | 345/428 |
| 2012/0008911 A1 | 1/2012 | Yoshida | |
| 2012/0192239 A1* | 7/2012 | Harwell et al. | 725/109 |

OTHER PUBLICATIONS

Epson, "Epson—The Undisputed Leader in Projectors", Exceed Your Vision, retrieved on Dec. 9, 2014, 3 pages. Also available at: http://www.epson.com/cgi-bin/Store/jsp/Landing/ProjectorsTechnology.do.
Intel, "Share Your Screen With Intel® Wireless Display (Intel® WiDi)", Intel® Wireless Display for home or work, retrieved on Dec. 9, 2014, 2 pages. Also available at: http://www.intel.com/content/www/us/en/architecture-and-technology/intel-wireless-display.html.
International Preliminary Report on Patentability and Written Opinion received for PCT Patent Application No. PCT/US2013/032188, dated Sep. 25, 2014, 11 pages.
International Search Report and Written Opinion received for PCT Patent Application No. PCT/US2013/032188, dated Jun. 28, 2013, 14 pages.

* cited by examiner

FIG. 7

WIRELESS ENHANCED PROJECTOR

RELATED APPLICATIONS

This application claims the benefit of priority of U.S. Provisional Patent Application Ser. No. 61/611,102 filed Mar. 15, 2012.

BACKGROUND

In lecture rooms or conference meetings, employing a projector greatly improves efficiency of teaching and presentations. For example, teachers or lecturers may easily demonstrate pre-recorded images at a large aspect ratio in a projection screen rather than presenting the pre-recorded images in a computer laptop screen or a monitor. The projector may be connected to a wireless device through wireless fidelity (WiFi) signals. The wireless projector may include a driver at the wireless device and the wireless device may thereafter operate the wireless projector. In case of more than one wireless device, the use of the wireless projector may become inconvenient to the users. For example, a first user needs to wait for its turn until the wireless projector is available for use. In this example, the first user may need to check and verify with other users if the other users are still using the wireless projector. These inconveniences may become more complicated in a classroom setting where individual students may want to present individual slides and/or presentations.

Furthermore, current wireless projectors may not be capable of self-adjusting screen resolutions and/or video formats that are required by the wireless devices. The user may still be required to perform adjustments on the wireless device for compatibility with current screen resolutions and/or video formats features of the current wireless projector.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing a wireless enhanced projector (WEP) in a server device or in a client device that includes a mobile phone, a cellular phone, a Smartphone, a personal digital assistant, a tablet computer, a netbook, a notebook computer, a laptop computer, a multimedia playback device, a digital music player, a digital video player, a navigational device, a digital camera, and the like. In an implementation, the server device may be a wireless access point (AP) or a system on a chip (SOC) that may transform a regular projector into WEP. In this implementation, the server device may connect through a radio signal (e.g., wireless fidelity (WiFi) signal, wireless display (WiDi) signal, etc.) with at least one client device and automatically deploys a WEP application to the at least one client device when wireless connection is established. Similarly, the at least one client device may automatically download the WEP application that is ready to use (i.e., no need to install) when the wireless connection is established with the server device. In an implementation, the WEP application may include a first-to-click launch button feature where the at least one client device may click it to be configured as a super-user client device. In this implementation, the super-user client device may implement access and control of the WEP that may be utilized by other users in a multi-user or multi-client device environment.

In an implementation, the super-user client device may be interrupted such as through desktop share interruption or video share interruption by the other client device. In this implementation, the interrupting client device may request the super-user client device to transfer the control of the WEP to the interrupting client device. Upon approval of this request, the super-user client device may terminate its control of the WEP and becomes a regular client device. In other words, when accessing or utilizing the WEP, the regular client device may first ask permission from the new super-user client device. In other implementations, the new super-user client device may have terminated its super-user device status (e.g., lost wireless connection, or expiration of time period) and the client device to first click on the first-to-click launch button feature of the WEP application may become the super-user device.

In an implementation, the interrupting client device may be using a WiDi signal while the current super-user client device may be using WiFi signal, or vice-versa.

Figure 1:
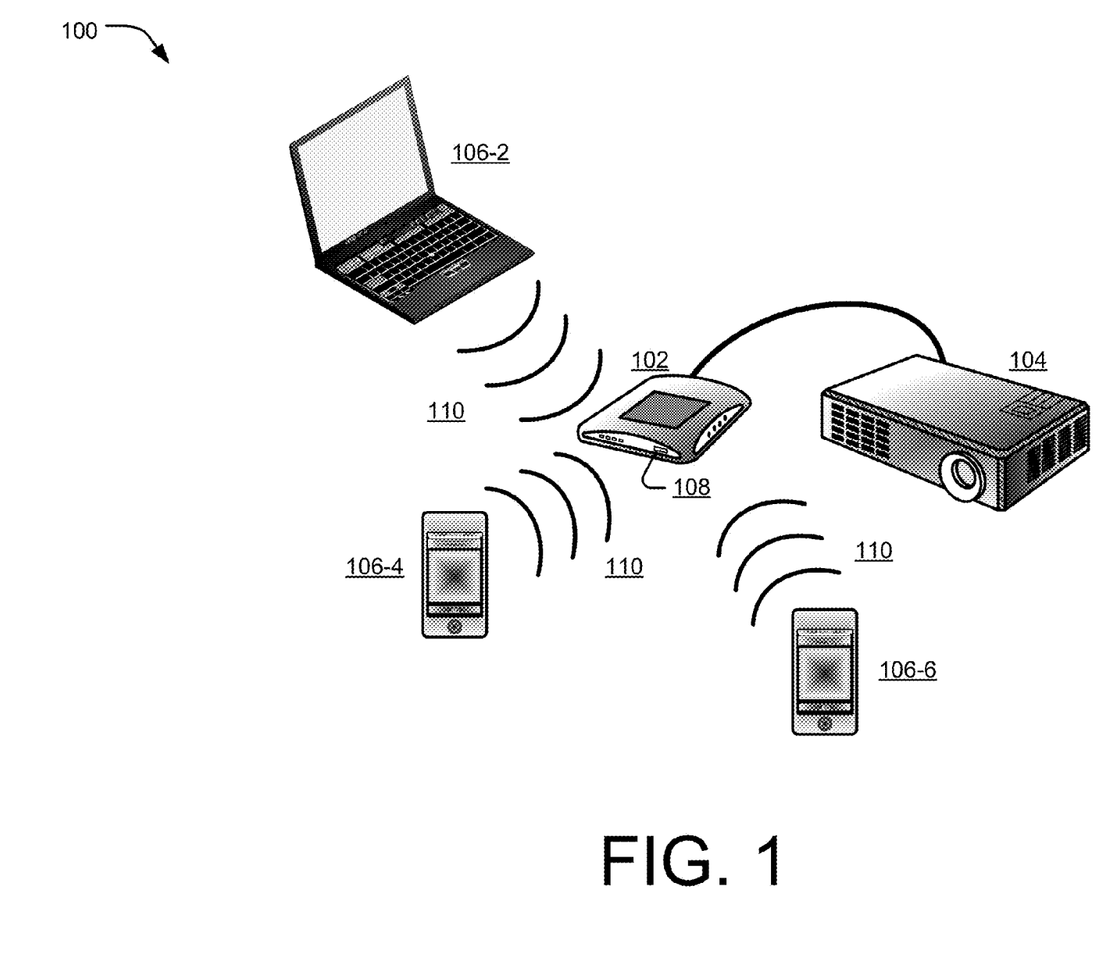
FIG. 1 illustrates an example arrangement for a wireless enhanced projector (WEP) that is utilized by at least one device for multimedia presentations.

FIG. 1 illustrates an example arrangement 100 of a single WEP that is utilized by at least one client device for multimedia presentations. The multimedia presentations may include projection into a projection surface (not shown) of a text, an audio, still images, animation, video, or interactivity content forms. In an implementation, a server device 102 may act as a wireless AP that is connected and/or integrated to a regular projector 104. In this implementation, WEP 104 device may include the regular projector 104 at the beginning and is transformed into WEP 104 device upon connection or integration of the server device 102. In an implementation, the server device 102—acting as the wireless AP—may provide its own wireless local area network (LAN) in which client devices 106 (e.g., laptop device 106-2, a first Smartphone 106-4, and a second Smartphone 106-6) may be able to access and open a web browser window (not shown). In the web browser window (not shown), the client devices 106 may be redirected to a WEP application webpage (not shown) that includes a first-to-click launch button feature. In an implementation, the first client device 106 to click the first-to-click launch button feature may be configured as a super-user client device 106. For example, when laptop device 106-2 clicks the first-to-click launch button feature, the super-user client device 106-2 may now control the WEP 104 when utilized by other client devices 106 such as the Smartphones 106-4 and 106-8. In this example, the other client devices 106 may first ask permission from the super-user client device 106-2 when using the WEP 104 for its multimedia presentations The server device 102 may be a SOC that includes a hardware module (i.e., SOC using Intel Architecture (IA)) that may be connected to any existing regular projector 104. Furthermore, the server device 102 may include a software component (not shown) that may be divided between "Server application" that runs the hardware module, and a "Client application" that may run in the client devices 106. The server device 102 may include a communication module 108 to establish wireless connections with the client devices 106 that utilize the WEP 104 for its multimedia presentations. The wireless connections/communications to the client devices 106 may be established through a radio signal 110 that may include a WiFi signal, a WiDi signal, a cellular signal, a Bluetooth™ signal, and the like. The client devices 106 may automatically download—from the server device 102—the WEP application (not shown) that is ready for use when the wireless connection is established between the client devices 106 and the server device 102.

The client devices 106 may include desktop sharing or video sharing when connected to the WEP 104. In this implementation, a super-user client device status may transfer from one client device 106 to another client device 106. For example, if the laptap device 106-2 is the first client device to click the first-to-click launch button feature of the downloaded WEP application, then the laptap device 106-2 is configured to be the super-user client device 106-2. In this example, the super-user client device status of the super-user client device 106-2 may continue until it is terminated due to transfer of super-user device status to another client device 106, lost wireless connection, power shut off by the super-user client device 106-2, time expirations, and the like.

Termination due to transfer of the super-user device status may be implemented when approval of request is given by the current super-user client device 106 to a requesting client device 106. In the above example, super-user client device 106-2 may terminate its super-user client device status by giving approval to a request from either of the Smartphones 106-2 or 106-4. Once the request approval is given, the requesting client device 106 (i.e., Smartphones 106-2 or 106-4 in the above example) may now become a new super-user client device while the original super-user device (i.e., laptop device 106-2) may become a regular client device 106 that needs a request approval before operating the WEP 104. In other implementations, the super-user client device status may reside in only one device 106. For example, in a classroom set-up, only the teacher's client device 106 may be configured to be the super-user client device 106 while the rest of the client devices 106 (i.e., used by students) may be configured as regular client devices 106.

The server device 102 may be configured to process HD multimedia presentations and/or to implement WiDi features of WiDi enabled client devices 106. For example, the WEP 104 may project HD videos that were streamed by the client devices 106. In this example, the projected HD videos may be shown on a projection surface or displays (not shown) rather than on a regular television (TV) that is commonly used to implement WiDi features of WiDi enabled devices 106. Furthermore, the server device 102 may be configured to implement image rescaling to adapt different screen resolutions and/or video formats that are required by the client devices 106. For example, the server device 102 may adapt an aspect ratio for the laptop device 106-2 that is different from the aspect ratio required by the Smartphone 106-4. In this example, the server device 102 may be configured to receive different screen resolutions of different device 106 models that may be connected to the server device 102.

Figure 2:
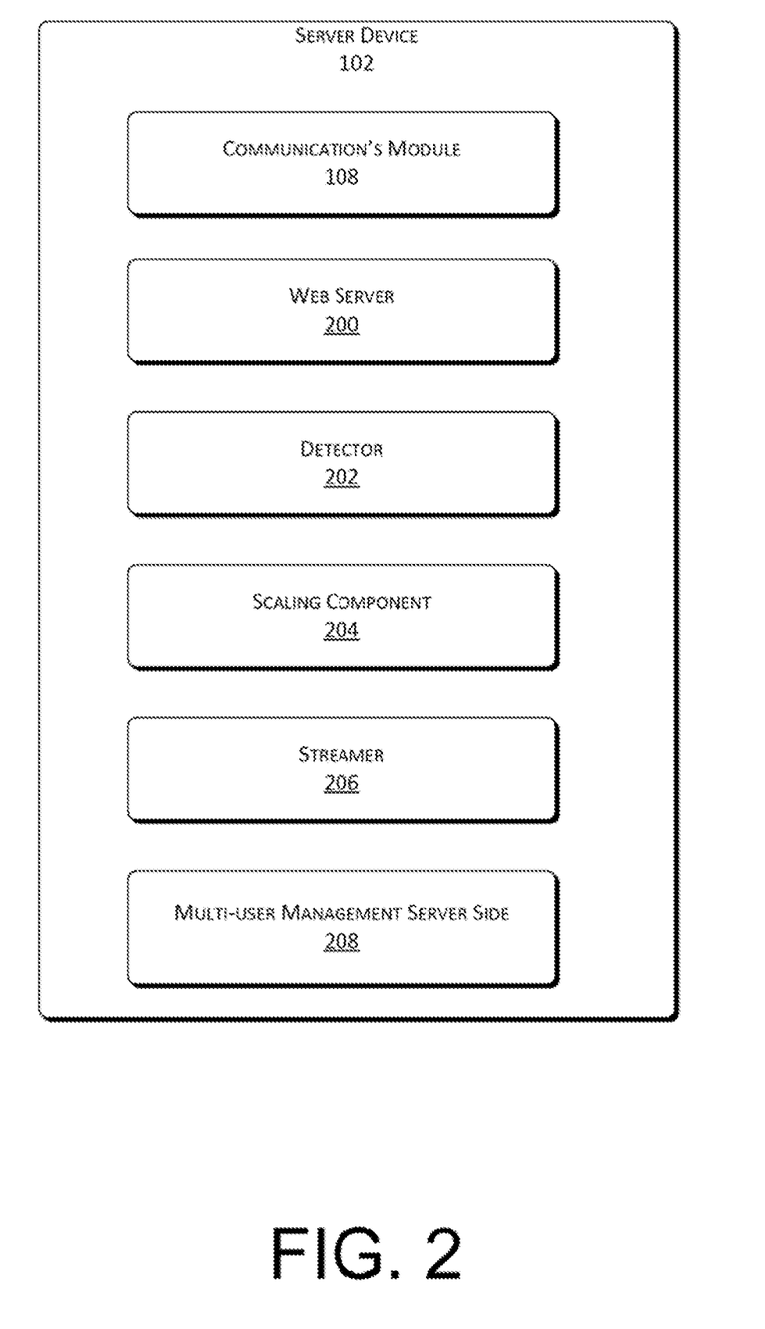
FIG. 2 illustrates an example server device.

FIG. 2 illustrates an example server device 102 to implement wireless enhanced projection of the multimedia presentations. For example, the server device 102 is a SOC that is integrated to a regular projector device (e.g., regular projector 104) to transform it into a WEP device (e.g., WEP 104). In certain implementations, the server device 102 may be implemented as part of a central processing unit, part of integrated circuit chipset, or be a separate component/device. As discussed above, in certain implementations, the server device 102 may be implemented as firmware or software. Furthermore, FIG. 2 is merely illustrative and may contain additional blocks or components and/or different arrangement of the blocks or components.

The wireless connection between the server device 102 and the client device 106 may be established through the communication's module 108. In such an implementation, the wireless connection may include the WiFi signal, WiDi signal, cellular signal, and the like. At the instant that the wireless connection is established, a web server component 200 may automatically deploy the WEP application (not shown) to the client device 106. In other words, the client device 106 may automatically download the WEP application (not shown) that is ready for use without further installation. As discussed above, the WEP application webpage (not shown) may include the first-to-click launch button feature and the first client device 106 to click it will be configured as the super-user client device 106.

A detector component 202 may detect the launching of the WEP application and the corresponding super-user client device 106 that launched it. The super-user client device 106 may maintain this super-user client device status until it is terminated due to power shut-off, transfer of the super-user client device status, expiration of time period, etc. The super-user client device 106 may control the access and utilization of the WEP 104 by other users (not shown) of the other client devices 106 in a multi-client device environment until its super-user client device status is terminated. In case of termination of the super-user client device status, the detector component 202 may detect a transferee of the super-user client device status if another client device 106 is given the approval to be the super-user client device 106, or another client device 106 is the first to launch the WEP application after the termination of the super-user client device status of the super-user client device 106.

A scaling component 204 may scale WiDi streams or movie streams, which are received from the client device 106. In this implementation, the streaming client device 106 may be the super-user client device 106 or the regular client device 106 that is given the permission to utilize the WEP 104 by the super-user client device 106. In server side image scaling, the scaling component 204 may scale images from the WiDi streams or movie streams before they are displayed on a screen (not shown). For example, the scaling component 204 may change server resolution to match a current image in the WiDi streams or movie streams. In this example, the scaling may be implemented when a resolution image from the client device 106 matches an existing resolution list on the server device 102. In an implementation, the scaling component may change the server resolution to fit next-best image case—with black bars surrounding invalid regions when the resolution image from the client device 106 is smaller and does not match the existing resolution list on the server device 102. At the client device 106 end, scaling may be implemented when the resolution image from the client device 106 is bigger and does not match the existing resolution list on the server device 102.

A streamer component 206 may stream the scaled WiDi streams or movie streams to be displayed on the screen (not shown). In this implementation, the streamer component 206 may simultaneously stream the WiDi streams or movie streams from two or more client devices 106. For example, the screen (not shown) may be split in order to be utilized by four client devices 106. In this example, the server device 102 may adjust to communications protocol used by the four client devices 106.

A multi-user management server side component 208 may handle all user management related privileges and rights when it comes to passing control between users of client devices 106. For example, the multi-user management server side component 208 may implement transfer of access and control of the WEP 104 upon detection of super-user device status transfer from one client device 106 to another client device 106.

Figure 3:
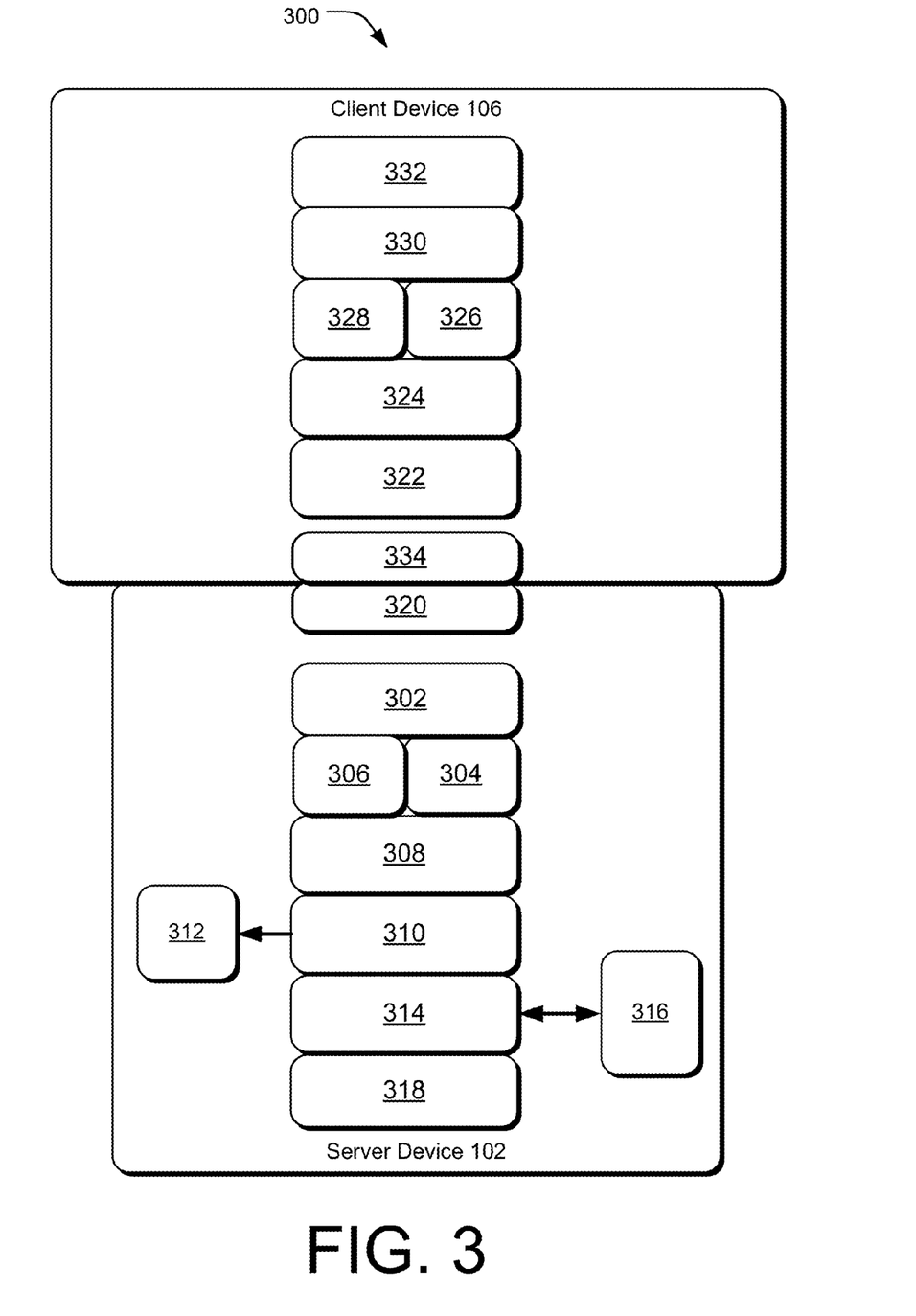
FIG. 3 illustrates an example server-client architecture to implement wireless enhanced projection of multimedia presentations by a wireless enhanced projector (WEP).

FIG. 3 shows an example server-client architecture 300 to illustrate operations between the server device 102 and the client device 106. In an implementation, the Server application may include a server core engine 302 to include a core server software module that coordinates all of other components in the server device 102. In this implementation, the other components may include a movie streamer 304, a movie player protocol pipeline 306, a screen 308, a server side image scaling 310, an image decode and overlay pipeline 312, a WiDi shared communication protocol engine 314, a WiDi to projector adaptor module 316, a multi-user management 318, and Server-shared communication protocol framework engine 320.

The movie streamer 304 module may enable movie streaming from the client device 106 to the server device 102. The Server application may be programmed beforehand to utilize a particular movie player. For example, a media player (MP) may be utilized via the Movie Player Protocol Pipeline 306 to play the streaming movie. In this example, the Movie Player Protocol Pipeline 306 may parse data logs and analyses current video screen of the Movie player (not shown) to ensure that the movie is streaming successfully. The streamed movie may be displayed on the screen 308, which may be configured to enable multiple client devices 106 to simultaneously share their screens in a split screen manner.

The server side image scaling 310 is similar to the scaling component 204. Particularly, in server side image scaling, the server side image scaling 310 may scale images from the WiDi streams or movie streams before they are displayed on the screen 308. The server side image scaling 310 may be further connected to the image decode and overlay pipeline 312. In an implementation, this pipeline is designed to be generic and scalable so that it would be adaptable enough to be used for different hardware and software platforms. For example, the pipeline may be customized to use open software library (LibVA) and VAAPI for decoding and overlay purposes.

The server device 102 may include the WiDi to projector adaptor module 316 to allow WiDi streams to be played at the WEP 104. The multi-user management 318 may handle client-related requests, which comes from multi-user management client side (not shown). The basic flow of permissions usage model is discussed in FIG. 4. Furthermore, the Server-shared communication protocol framework engine 320 may serve as a one point layer where communication channels may pass through. For example, modifications done on the server protocol may be automatically reflected on the client communication protocol (not shown).

The Client application may include a client core engine 322 that coordinates all of other components in the client device 106. In this implementation, the other components may include a multi-threaded capture & encode 324, a movie streamer 326, a movie format correction 328, a WiDi initiate and detection engine 330, a multi-user management 332, and a Client-shared communication protocol framework engine 334. In an implementation, the multi-threaded capture & encode 324 may create multiple processes based on number of CPU cores available on the client device 106. The multi-threaded capture & encode 324 may further include a frame buffer access (not shown) to access the frame buffer of the client device 106, which returns screen capture of current desktop in the client device 106. The multi-threaded capture & encode 324 may also include a) image encode (not shown) to compress the image so that it may be streamed over to the server device 102 at an optimal Frames per Second (FPS); and b) client image rescale (not shown) to obtain a signal from the server device 102 if client-side image scaling may be required.

The movie streamer 326 may enable the movie streaming to the server device 102. In this implementation, the player is located on the server derive 102; however, the mechanics to partition the movie and sending it in packets for streaming is implemented in the movie streamer 326. Moreover, the Client application includes the movie format correction 328 in order to correct movie formats for streaming purposes. For example, an MP-4 format is corrected for streaming by swapping the atom media data (MDAT) and movie atom (MOOV) positions accordingly for both 32 bit and 64 bit formats while atom sample table chunk offset (STCO) is recalculated.

The WiDi initiate and detection engine 330 may enable WiDi to be detected on the client device 106, and signals to the Client application accordingly. In this implementation, the Client application may take appropriate actions depending on version of the WiDi that exists on the client device 106. How WiDi interacts with the other projector users (not shown) of other client devices 106 is illustrated in FIGS. 4 and 5.

The multi-user management 332 may create and send signal requests for elevated rights to the server device 102. For example, the multi-user management 332 may implement termination of the super-user client device status based on approval of a request by an interrupting client device 106. In addition, the Client application may enable or disable certain features on the client side depending on the current permissions list. The flow of the permissions usage model is illustrated in FIG. 3. In an implementation, the Client-shared communication protocol framework engine 334 may serve as a one point layer where communication channels may pass through. For example, modifications done on the server protocol may be automatically reflected on the client communication protocol (not shown).

Figure 4:
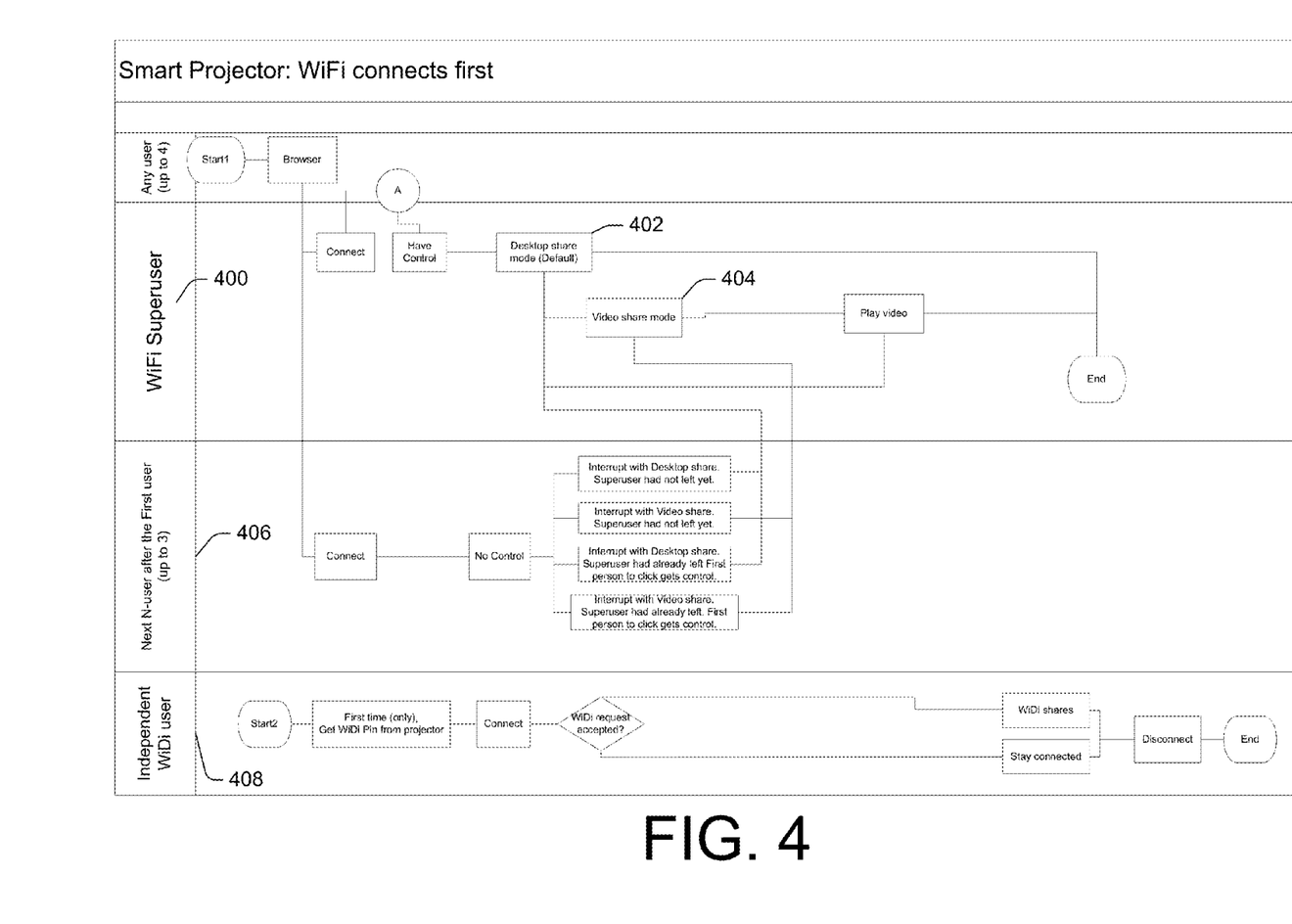
FIG. 4 illustrates an example interaction between client devices to include a wireless fidelity (WiFi) signal connecting first.
Figure 5:
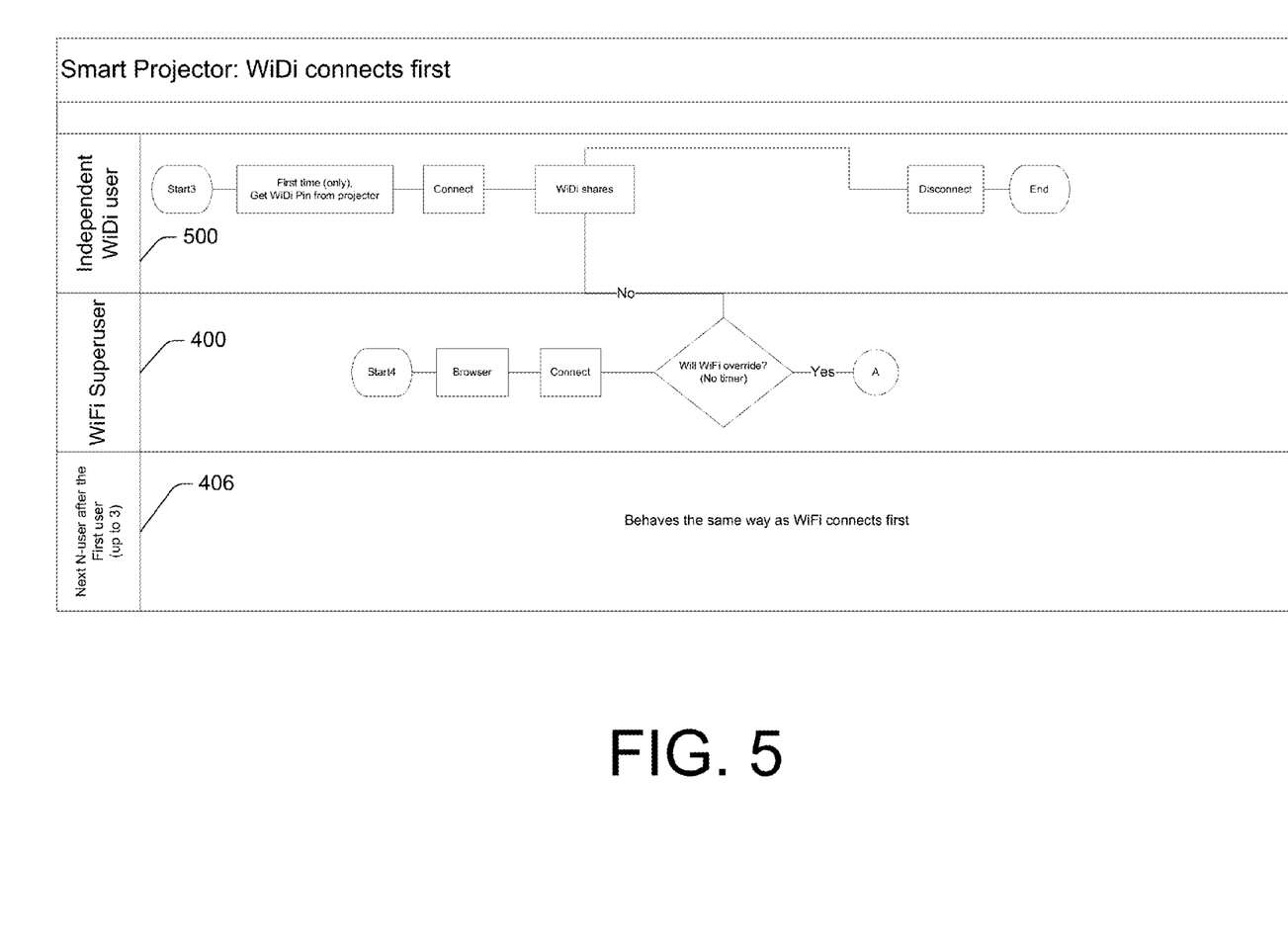
FIG. 5 illustrates an example interaction between client devices to include a wireless display (WiDi) signal connecting first.

FIG. 4 illustrates an example interaction between client devices 106 when utilizing the WEP 104. In an implementation, FIG. 4 shows an example WiFi connects first diagram where a WiFi super-user 400 is in control of the WEP 104. In this implementation, the WiFi super-user 400 is the first to launch the WEP application and connects to the server device through a WiFi signal. The WiFi super-user 400 may operate at a desktop share mode 402 by default or at video share mode 404. At desktop share mode 402, multiple numbers of users 406 (i.e., users other than the first user/ WiFi super-user 400) may have no control of the WEP 104. In an implementation, the multiple numbers of users 406 of other client devices 106 may interrupt the WiFi super-user 400 through desktop share or video share. In this implementation, the WiFi super-user 400 may accept or decline the request of the multiple numbers of users 406 with regard to transfer of super-user client device status from the WiFi super-user 400 to the requesting client device 106.

An independent WiDi user 408 may prompt the WiFi super-user 400 to operate in WiDi mode (not shown) if the WiFi super-user 400 may accept a request to launch WiDi mode. Otherwise, the WiFi super-user 400 may revert back to its previous state from the WiDi mode. As discussed above, the ability of WiFi super-user 400 to transfer and terminate its super-user client device status is exemplified in FIG. 4. FIG. 4 is merely illustrative and may contain additional blocks or components and/or different arrangement of the blocks or components FIG. 5 illustrates an example interaction between client devices 106 when utilizing the WEP 104. FIG. 5 shows an example WiDi connects first diagram where an independent WiDi user 500 may connect first with the server device 102 through the WiDi signal (not shown). In other words, the WiDi user 500 is the first one to launch the WEP application through its WiDi signal connection. A subsequent client device 106 (or WiFi super-user 400) may connect with the server device 102 through its WiFi signal (not shown) and may override the independent WiDi user 500 in utilizing the WEP 104. Once the WiFi super-user 400 is in control of the WEP 104, the operation for the multiple numbers of users 406 is the same as described in FIG. 4.

Figure 6:
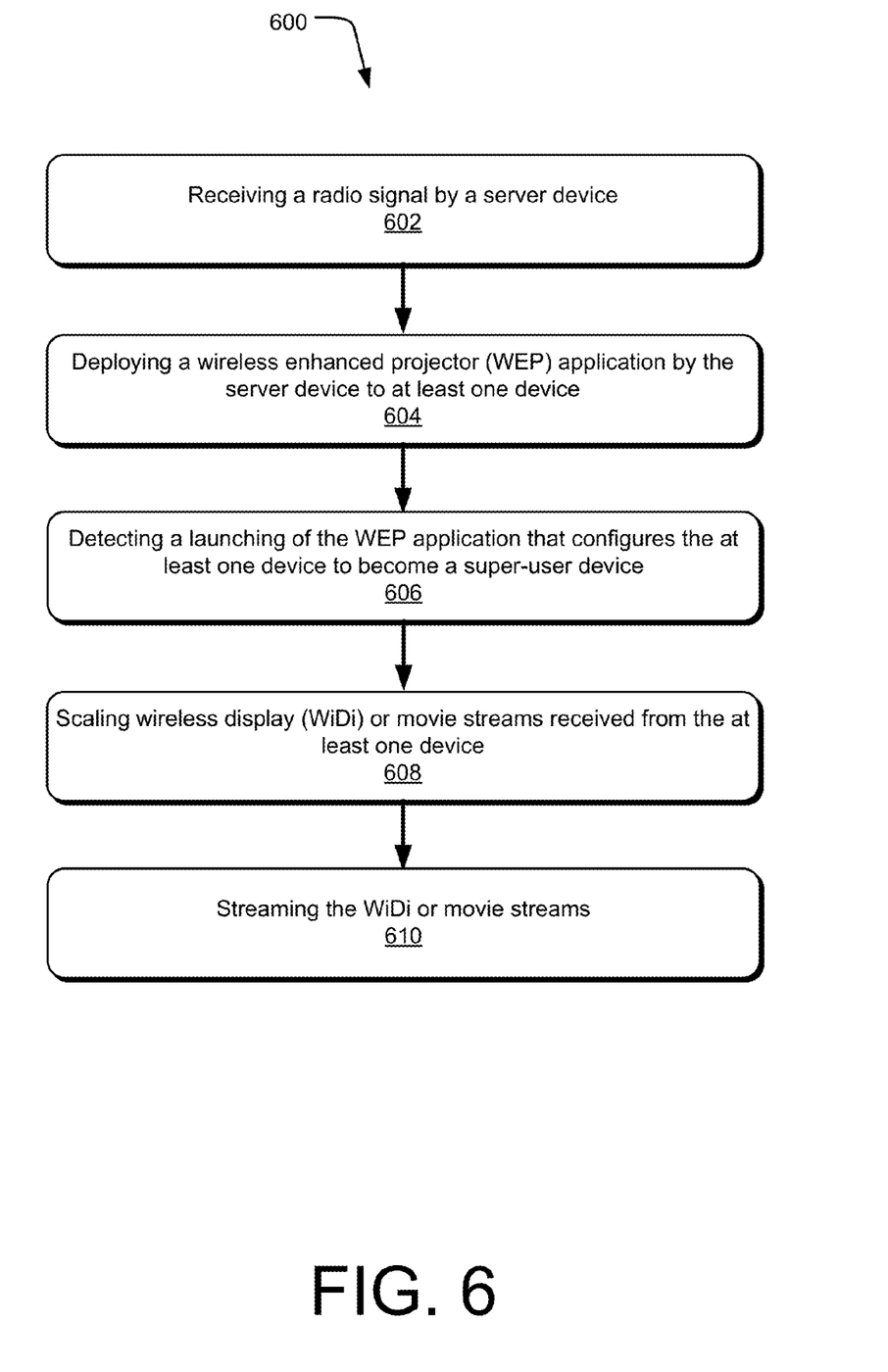
FIG. 6 illustrates an example method for implementing wireless enhanced projector (WEP) in a server device.

FIG. 6 shows an example process chart 600 illustrating an example method for implementing a WEP at the server device 102. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, receiving a radio signal by a server device is performed. In an implementation, the server device (e.g., server device 102) may receive the radio signal that includes a WiFi signal, WiDi signal, cellular signal, etc. from a client device (e.g., client device 106). In this implementation, wireless connection may be established between the server device 102 and the client device 106.

At block 604, deploying a WEP application is performed. In an implementation, the server device 102 may include a web server (e.g., web server 200) to automatically deploy the WEP application to the client device 106 that established connection with the server device 102. In this implementation, the client device 106 may automatically download the WEP application that is ready for use without need of installation and may click its first-to-click launch button feature to be configured as a super-user client device (e.g., super-user client device 106).

At block 606, detecting a launching of the WEP application is performed. In an implementation, the client device 106 to first click the first-to-click launch button feature of the WEP application is configured as the super-user client device (e.g., super-user client device 106).

At block 608, scaling of WiDi or movie streams is performed. In an implementation, the WiDi or movie streams may be received by the server device 102 from the client device 106 that is granted permission (i.e., in case of non super-user device) to utilize the WEP 104.

At block 610, streaming the WiDi or movie streams is performed.

Figure 7:
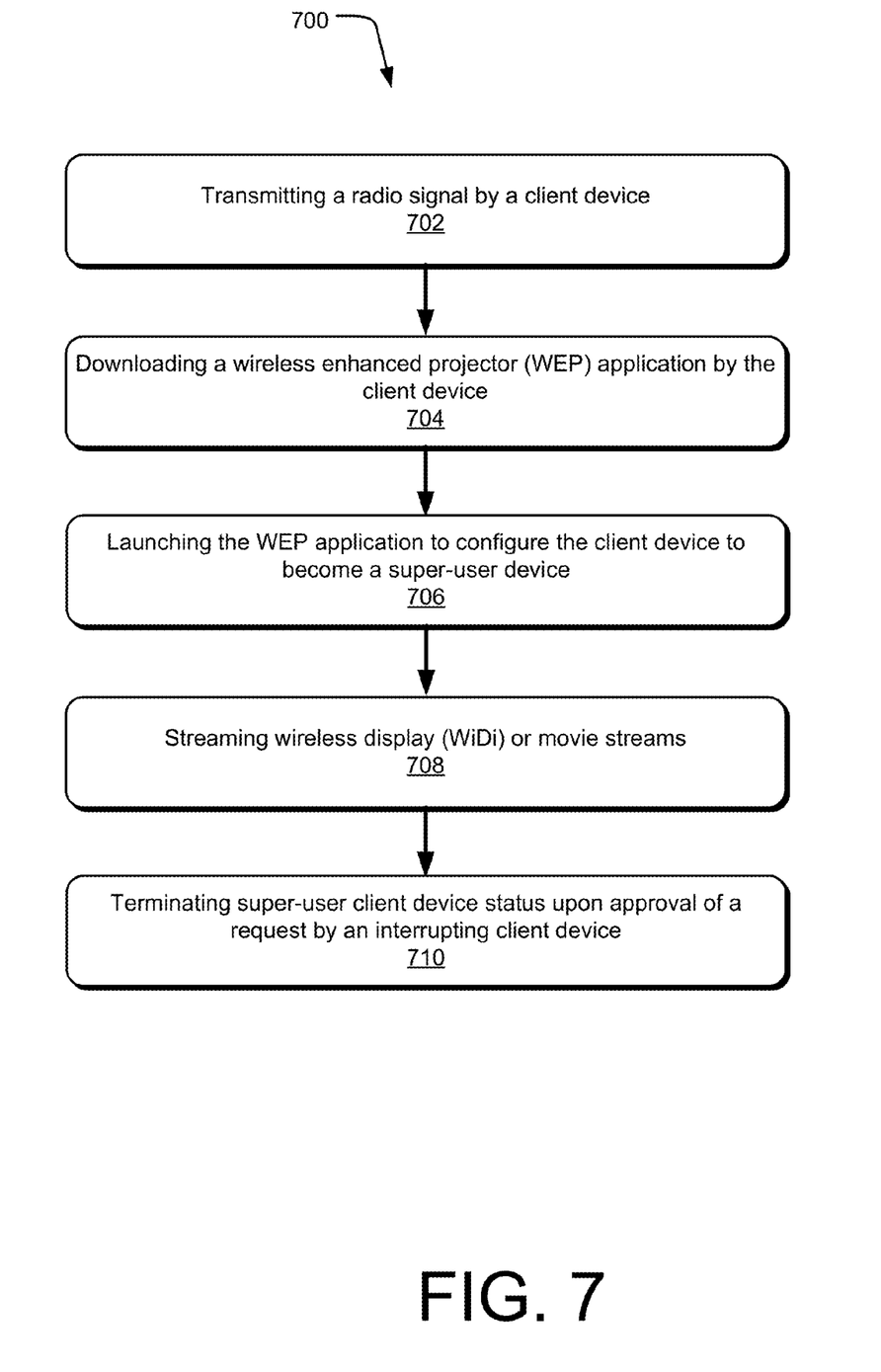
FIG. 7 illustrates an example method for implementing wireless enhanced projector (WEP) in a client device.

FIG. 7 shows an example process chart 700 illustrating an example method for implementing a WEP at the client device 102. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, transmitting a radio signal by a server device is performed. In an implementation, the client device 106 may transmit the radio signal that includes a WiFi signal, WiDi signal, cellular signal, etc. In this implementation, the wireless connection may be established between the server device 102 and the client device 106.

At block 704, downloading a WEP application is performed. In an implementation, the client device 106 may automatically download the WEP application and may click its first-to-click launch button feature to be configured as a super-device.

At block 706, launching of the WEP application is performed. In an implementation, the clicking of the first-to-click launch button feature of the WEP application launches the WEP application.

At block 708, streaming of WiDi or movie streams is performed. In an implementation, the WiDi or movie streams may be initiated by the client device 106 that is granted permission (i.e., in case of non super-user device) to utilize the WEP 104, or the super-user client device 106.

At block 710, terminating super-user client device status upon approval of a request by an interrupting client device is performed. In an implementation, other client devices 106 may interrupt through desktop sharing or video sharing the super-user client device 106. In this implementation, the interrupting client devices 106 may send a request to the super-user client device 106 for the transfer of super-user client device status in order to gain control of the WEP 104 through the server device 102.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Figure 8:
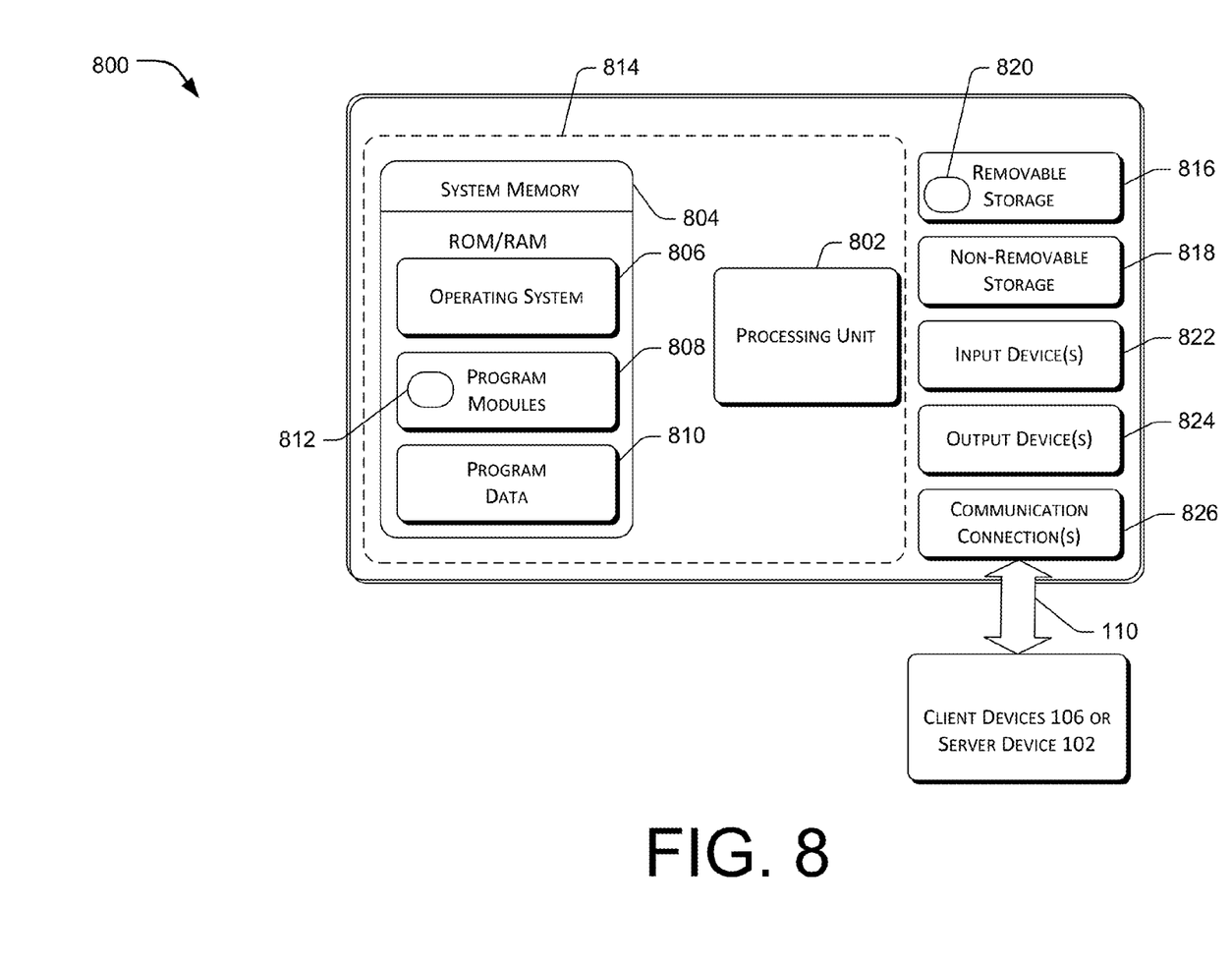
FIG. 8 illustrates an example computing device to implement a server device that is connected and/or integrated to a regular projector.

FIG. 8 is an example system that may be utilized to implement the server device 102 or the client device 106 as described above. However, it will be readily appreciated that the techniques disclosed herein may be implemented in other computing devices, systems, and environments. The computing device 800 shown in FIG. 8 is one example of a computing device to implement the server device 102 or the client device 106 and is not intended to suggest any limitation as to the scope of use or functionality of the computer and network architectures.

In at least one implementation, computing device 800 typically includes at least one processing unit 802 and system memory 804. Depending on the exact configuration and type of computing device, system memory 804 may be volatile (such as RAM), non-volatile (such as ROM, flash memory, etc.) or some combination thereof. System memory 804 may include an operating system 806, one or more program modules 808 that implement the server device 102 or client device 106, and may include program data 810. For example, the program modules 808 may be configured to download automatically the WEP application that is ready for use without need of installation when the wireless connection is established. A basic implementation of the computing device 800 is demarcated by a dashed line 814.

The program module 808 may include a module 812 configured to implement the utilization of a single WEP 104 by client devices 106 when the computing device 800 is acting as the server device 102. For example, the module 812 may carry out one or more of the method 600, and variations thereof, e.g., the computing device 800 acting as described above with respect to the server device 102. Similarly, the computing device 800, acting as the client device 106, may carry out one or more of the method 700 and the variations thereof through the module 812.

Computing device 800 may have additional features or functionality. For example, computing device 800 may also include additional data storage devices such as removable storage 816 and non-removable storage 818. In certain implementations, the removable storage 816 and non-removable storage 818 are an example of computer accessible media for storing instructions that are executable by the processing unit 802 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 800. Any of such computer accessible media may be part of the computing device 800.

In one implementation, the removable storage 816, which is a computer accessible medium, has a set of instructions 820 stored thereon. When executed by the processing unit 802, the set of instructions 820 cause the processing unit 802 to execute operations, tasks, functions and/or methods as described above, including methods 700 or 800 and any variations thereof.

Computing device 800 may also include one or more input devices 822 such as keyboard, mouse, pen, voice input device, touch input device, etc. Computing device 800 may additionally include one or more output devices 824 such as a display, speakers, printer, etc.

Computing device 800 may also include one or more communication connections 826 that allow the computing device 800 to communicate wirelessly with one or more other devices 106, when acting as the server device 102, or to communicate wirelessly with the server device 102 when acting as the client device 106.

It is appreciated that the illustrated computing device 800 is one example of a suitable device and is not intended to suggest any limitation as to the scope of use or functionality of the various embodiments described.

Unless the context indicates otherwise, the term "Universal Resource Identifier" as used herein includes any identifier, including a GUID, serial number, or the like.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

What is claimed is:

1. A method of implementing a wireless enhanced projector (WEP) at a device comprising:
   receiving a radio signal from at least one client device;
   deploying a WEP application to the at least one client device, wherein the deployed WEP application facilitates coordinated multimedia presentations from a plurality of client devices;
   detecting a launching of the WEP application from the at least one client device, wherein the at least one client device that is first detected to have launched the WEP application is configured to become a super-user device;
   scaling images of WiDi streams or movie streams received from each client device of the plurality of client devices based upon image resolution lists stored on the corresponding client device; and
   simultaneous split-streaming of the scaled WiDi streams or movie streams from each client device of the plurality of client devices, wherein the simultaneous split-streaming is based from each communication protocol used by each of the plurality of client devices.

2. The method of as recited in claim 1, wherein the radio signal includes a wireless fidelity (WiFi) signal, a wireless display (WiDi) signal, or a cellular signal.

3. The method as recited in claim 1, wherein the launching of the WEP application includes a first-to-click launch button feature.

4. The method as recited in claim 1, wherein the super-user device implements access and control of the projector by other users of other client devices.

5. The method as recited in claim 1, wherein the device includes an open source library or video acceleration application program interface for decoding and overlay purpose.

6. The method as recited in claim 1, wherein the super-user device is prompted to operate at wireless display (WiDi) mode upon approval of a request from an interrupting independent wireless display (WiDi) user.

7. The method as recited in claim 1, wherein the super-user device, which is initially configured to an independent wireless display (WiDi) user, is overridden by a WiFi super-user device.

8. The method as recited in claim 1, wherein the scaling includes changing server device resolution to match a current image.

9. The method as recited in claim 1, wherein a super-user device status of the super-user device is terminated based upon one of lost wireless connection, power shutoff in the device, or transfer of a super-user device status from the super-user device to another client device.

10. At least one non-transitory computer accessible medium that performs a method for implementing a wireless enhanced projector (WEP) in a device comprising:
    receiving a radio signal by the device from at least one client device;
    deploying a WEP application by the device to the at least one client device upon establishing wireless connection, wherein the deployed WEP application facilitates coordinated multimedia presentations from a plurality of client devices;
    detecting a launching of the WEP application from the at least one client device, wherein the at least one client device that is first detected to have launched the WEP application is configured to become a super-user device;
    scaling images of WiDi streams or movie streams received from each client device of the plurality of client devices that includes the at least one client device based upon image resolution lists stored on the corresponding client device; and
    simultaneous split-streaming of the scaled WiDi streams or movie streams from each client device of the plurality of client devices, wherein the simultaneous streaming is based from each communication protocol used by each of the plurality of client devices.

11. The at least one non-transitory computer accessible medium as recited in claim 10, wherein the radio signal includes a wireless fidelity (WiFi) signal, a wireless display (WiDi) signal, or a cellular signal.

12. The at least one non-transitory computer accessible medium as recited in claim 10, wherein the launching of the WEP application includes a first-to-click launch button feature.

13. The at least one non-transitory computer accessible medium as recited in claim 10, wherein the super-user device implements access and control of the projector by other users of other devices in a multi-user or multidevice environment.

14. The at least one non-transitory computer accessible medium as recited in claim 10, wherein the device includes an open source library or video acceleration application program interface for decoding and overlay purpose.

15. The at least one non-transitory computer accessible medium as recited in claim 10, wherein the super-user device is prompted to operate at wireless display (WiDi) mode upon approval of a request from an interrupting independent wireless display (WiDi) user.

16. The at least one non-transitory computer accessible medium as recited in claim 10, wherein the super-user device, which is initially configured to an independent wireless display (WiDi) user, is overridden by a WiFi super-user device in implementing access and control of a projector.

17. The at least one non-transitory computer accessible medium as recited in claim 10, wherein the scaling includes changing server device resolution to match a current image.

18. The at least one non-transitory computer accessible medium as recited in claim 10, wherein a super-user device status of the super-user device is terminated based upon one of a lost wireless connection, power shutoff in the device, or transfer of a super-user device status from the super-user device to another client device.

* * * * *